3,458,359
PROCESS FOR ACTIVATING A FUEL CELL
BY DISCHARGING FROM ABOUT 0.05 TO
10 MA./CM.²
Masataro Fukuda, Takatsuki, Osaka, Japan, and Philip J. Elving and Charles L. Rulfs, Ann Arbor, Mich., assignors to Sinclair Research, Inc., New York, N.Y., a corporation of Delaware
No Drawing. Filed Oct. 11, 1965, Ser. No. 494,954
Int. Cl. H01m 27/12
U.S. Cl. 136—86                          13 Claims

ABSTRACT OF THE DISCLOSURE

A process for activating the fuel electrode of a fuel-oxygen fuel cell to increase the open-circuit fuel half-cell potential upon activation. With no load current being drawn, a small direct current is discharged from the fuel electrode for a brief period The current can be in the range of about 0.05 to 10 milliamperes per square centimeter. The discharge period can be in the range of about 1 to 30 seconds and during the discharge period a plurality of small current pulses can be discharged. To further increase the open-circuit potential, the discharge period can be repeated at intervals of about 10 to 60 minutes over a period of about 2 to 8 hours.

---

This invention relates to improvements in systems wherein combustible fuels are oxidized and a substantial portion of the resulting energy of oxidatiton is converted directly, i.e., by electrochemical reaction, to electrical energy.

In particular, this invention relates to an improved method whereby fuel electrodes, especially those operating in low temperature fuel-oxygen fuel cells, can be activated to increase the open-circuit fuel half-cell potential thereof.

It long has been known that electric current can be produced directly from combustible materials by electrochemical reaction. In recent years, however, research activity in this field has been greatly accelerated. The vehicle for carrying out such reactions has become known in the art as the "fuel cell."

The true fuel cell differs from other primary batteries in that fuel is continuously or intermittently supplied to the cell and its electrodes are not consumed. Attention has been drawn to the fuel cell largely because of the potentially higher efficiency obtainable in the conversion of natural fuels to electrical energy by this means as compared to conventional means of power production. The theoretical efficiency of energy conversion in the fuel cell approaches 100% and operating efficiencies approaching 75% have been claimed in the literature.

Briefly stated, a fuel cell essentially comprises (1) means for containing a preselected chemical reaction of the type in which the reactants separately possess more energy than the product they form, and (2) means for capturing the "excess" energy formed by the reaction as electrical energy. The requisites of an operating fuel cell include at least one fuel electrode and one oxidizing gas electrode, an electrolyte, an oxidizing gas and a supply of combustible fuel. Typical of the fuels which can be employed in fuel cells are oxidizable fuel gas or liquids including hydrogen, carbon monoxide and hydrocarbons and other oxidizable organic chemicals such as methanol, methane, propane, propylene and kerosene vapors, however, other carbonaceous fuels may be employed. Oxygen is the preferred oxidizing gas although the present invention is not limited thereto. The electrolyte must be a medium in which ionic mobility can be achieved. A most satisfactory electrolyte is found among the hydroxides of the alkali metals such, for example, as sodium hydroxide, potassium hydroxide and the like. Also, acidic electrolytes such as mineral acids, e.g. sulfuric and phosphoric acids, can be used.

Fuel cells function by virtue of electrochemical oxidation of a fuel at one electrode (referred to as the anode) and electrochemical reduction of oxygen at the other electrode (referred to as the cathode). Such electrochemical reactions usually involve the establishment of a three-phase zone, electrode catalyst/fuel/electrolyte although where the fuel is dissolved in the electrolyte when the fuel contacts the catalyst a two phase zone may be used. These reactions concern very complicated processes which include all of the steps by which an oxidant (or reductant) moves from the bulk gaseous phase to the electrode, the transformation which occurs on or near the electrode, and the means by which products are removed from the vicinity of the electrode. In addition, the electrode must offer a continuous conductive path for electron flow to or from the external circuit.

Generally, these demanding activity requirements can be fulfilled satisfactorily by promoting the electrode with certain precious metals. Where unusually nonreactive fuels are concerned, however, additional treatment of the promoted electrode has been found advantageous to provide sufficient activity to obtain significant amounts of electricity.

It has now been found that a rapid increase in the open circuit fuel half-cell potential of electrodes is experienced after the load has been removed, when the electrode is subjected to discharges of small direct currents for a few seconds, e.g. from about 1 to 30 seconds, particularly from about 3 to 15 seconds, ranging from about 0.05 to 10 ma./cm.² and particularly up to about 6 ma./cm.², preferably 0.1 to 2 ma./cm.² after the electrode has been installed in the fuel cell. The discharges can be continuous or can be applied as a sequence of short repeated discharges, and the small currents may be obtained using a circuit consisting essentially of the fuel cell, an automatic decording potentiometer, and a resistive load drawing less than about 0.05 ma. One application of the discharges may be sufficient; however, some electrodes may require the reapplication of the discharges at intervals of several minutes, e.g. about 10 minutes to an hour, particularly at intervals of about 15 to 30 minutes, over a period of several hours, e.g. about 2 to 8 hours. The present invention can be used to activate fuel electrodes for use in fuel cells produced in any of the conventional manners. The fuel electrodes can be prepared according to the process of applicants' copending application Ser. No. 494,550, filed Oct. 11, 1965, for example, or by impregnating porous sintered nickel or carbon discs with a solution containing the catalytic material, e.g., a palladium chloride solution prepared by dissolving $PdCl_2 \cdot 2H_2O$ in dilute hydrochloric acid solution. After being dried, the impregnated palladium chloride in the electrode is reduced at 195° to 205° C. for 15 hours in a hydrogen furnace. Alternatively, the reduction can be accomplished by placing the impregnated disc in a sodium formate solution, which is kept at from about 60° to 80° C., until the evolution of $CO_2$ gas stops and then adjusting the pH of the solution to about 1 by the addition of HCl and boiling the solution containing the disc. The disc may then be dried, washed with water and treated with a boiling dilute HCl solution. This washing procedure may be repeated several times.

Other promoting metals which can be used to promote fuel electrodes for use in fuel cells include platinum, nickel, rhodium, gold, neolymium, cobalt, ruthenuim, cadmium, molybdenum, copper, silver, osmium, manganese, lead, etc. The metals of Group VIII of the periodic system are particularly useful. The promoting metal is usually present in the range of about 0.1–5 weight percent, particularly about 0.5 to 2.5 weight percent.

The promoted, reduced electrodes are preferably subjected to a water-proofing treatment prior to use, for example, by impregnation with a solution of paraffin wax of M.P. range 68–72° C. or 77–81° C. in petroleum ether (B.P. range 60–75° C.) or methylcyclohexane and then dried. The weight percentages of the impregnated wax are usually in the range of 1 to 4%.

The following examples serve to further illustrate the invention. In these examples, potential measurements of the electrode were made in an experimental glass cell using a negative, e.g. fuel, electrode having an apparent surface area of approximately 1 cm.$^2$. A relatively large piece of a carbon block was used as the positive, oxidizing gas, electrode. This block was exposed to air and had a much larger capacity than that of the fuel electrodes. The two electrodes were situated in a rectangular glass jar containing 30% KOH solution as the electrolyte. The experimental cell and a HgO reference electrode half-cell were kept at about 50° C. in a liquid bath. An immersion electric heater connected to an automatic electric relay, a thermostat, an electric stirred and a mercury thermometer were placed in a large glass jar insulated with a glass wool mat. A 1:1 mixture of polyethylene glycol (Carbowax 400) and water was used as the bath liquid.

Fuel gas was introduced into the negative electrode side of the experimental cell by being led from its cylinder through a copper wire-filled tube and drying bottles containing Drierite. The gas pressure was controlled. The gas-supply line could also be connected to hydrogen or nitrogen supply lines.

The positive and negative electrodes of the fuel cell were connected to terminals by platinum wires and electrical circuits consisting of (a) the circuit for the fuel cell discharge and (b) that for measuring and, if desired, recording the electrode potential were connected to the terminals as desired. The former consisted of booster batteries, rheostats, a milliammeter and a voltmeter, arranged to permit measurement during a constant current discharge. The latter consisted of the HgO electrode, potentiometer and an automatically recording potentiometer. The electrode potentials measured and referred to hereinbelow are the fuel half-cell potential measured against the HgO-KOH reference electrode.

In general, various Pd promoted substrates subjected to discharges of small currents for a few seconds in accordance with the present invention achieved open circuit fuel half cell potentials (vs. HgO reference electrode) on propane which were greater by a magnitude of 3–4 times than their open circuit potentials prior to the current application. The following specific examples serve to further illustrate the invention.

EXAMPLE I

A Pd-promoted porous carbon (Speer Carbon Co. grade 33/7716) fuel electrode was used with propane fuel. The porous carbon had a thickness of 3.15 mm., 25% porosity and 0.8–10 micron pore size. The open circuit fuel half cell potential before pulse activation was unstable (−0.24 to −0.44 v.). Following 20 pulse periods over 6 hours, the open circuit fuel cell potential increased to −0.894 v. Small repeated discharges of about 0.1 ma. were applied during each of the pulse periods.

EXAMPLE II

A Pd-promoted porous carbon (Morganite Carbon Co. grade CY 111) fuel electrode was used with propane fuel. The open circuit fuel half-cell potential before pulse activation was −0.2 v. It increased rapidly to −0.9 v. after 4 pulse periods of 2.0 ma. repeated discharges.

EXAMPLE III

A Pd-promoted porous nickel (Clevite Co. grade 0327-B) fuel electrode was used with propane fuel. The open circuit fuel half cell potential before pulse activation was −0.680 v. After repeated discharges in the range of 0.1 to 0.5 ma., it increased to −0.927 v. in apporximately one hour.

EXAMPLE IV

After the measurement of initial open circuit potentials for propane described in Examples I–III, the electrodes studied were subjected to repeated discharge tests at current densities of 2 to 100 ma./cm.$^2$. These tests were made after the open circuit potential had reached a steady value near −0.9 v. as the result of the repetition of small discharges, e.g. 0.05 to 6 ma./cm.$^2$, as described above.

With the electrodes used in Examples I and II, potentials as high as −0.9 v. were obtained by the repetition of small discharges. The discharge behavior of the electrode of Example I seemed to improve with repeated discharges in the range of 2 ma. to 10 ma. The same tendency was found for the electrode of Example II; however, the potential during discharge sometimes suddenly either rose or fell, exhibiting two different plateau voltages at each current density.

The electrode used in Example III had comparatively clean and good discharge characteristics. The plateau voltage in a 10-min. discharge was −0.925 v. (constant) for 2 ma., −0.906 v. (constant) for 5 ma., −0.85 v. for 10 ma. and −0.68 v. for 20 ma. Moreover, though the discharge curve for 50 ma. (and 100 ma.) had a large inclination, its approximate average voltage for the initial 5 min. discharge was 0.5 v. for 50 ma., and about −0.3 v. for 100 ma.

EXAMPLE V

The pulse activation procedure of Examples I to III will improve the open circuit fuel half cell potential thereof when applied to electrodes containing, for instance, the following promoting metals: platinum, nickel, silver, copper, osmium, and cobalt.

EXAMPLE VI

The pulse activation procedure of Examples I to III will, for instance, improve the open circuit fuel half cell potential in the following fuels when applied to palladium-promoted electrodes: hydrogen, methane, propylene and methanol.

It is claimed:

1. In a method including the step of operating a fuel cell wherein a combustible fuel is oxidized and the energy of oxidation is converted directly to electrical energy, said fuel cell including a metal-promoted fuel electrode, an oxidizing gas electrode and an electrolyte, the improvement which comprises a method of activating said fuel electrode comprising installing said fuel electrode in said fuel cell, subjecting said fuel electrode prior to operating said fuel cell to discharge of a small current ranging from about 0.05 to about 10 ma./cm.$^2$ over a pulse period of several seconds to increase the open-circuit fuel half-cell potential upon activation, and thereafter operating said fuel cell.

2. The method of claim 1 wherein said pulse period is from about 1 to 30 seconds duration.

3. The method of claim 2 wherein said pulse period consists of a plurality of small repeated discharges.

4. The method of claim 2 wherein said discharge is continuous during said pulse period.

5. The method of claim 1 wherein said current ranges from about 0.1 to 2 ma./cm.$^2$.

6. A method as defined in claim 1 wherein said electrode is subjected to a plurality of said pulse periods spaced at intervals over a period of several hours.

7. A method as defined in claim 6 wherein said pulse periods are repeated at intervals of from about 10 to 60 minutes over a period of from about 2 to 8 hours.

8. A method as defined in claim 7 wherein each said pulse period is from about 1 to 30 seconds duration.

9. A method as defined in claim 8 wherein said current ranges from about 0.1 to 2 ma./cm.$^2$.

10. In a method including the step of operating a fuel cell wherein a combustible fuel is oxidized and the energy of oxidation is converted directly to electrical energy, said fuel cell including a metal-promoted fuel electrode, an oxidizing gas electrode and an electrolyte, the improvement which comprises a method of activating said fuel electrode comprising subjecting said fuel electrode to discharge of a small current ranging from about 0.05 to about 10 ma./cm.$^2$ over a pulse period of several seconds to increase the open-circuit fuel half-cell potential upon activation, and thereafter operating said fuel cell.

11. The method of claim 10 wherein said pulse period is from about 1 to 30 seconds duration.

12. The method of claim 11 wherein said pulse period is repeated at intervals from about 10 to 60 minutes over a period of from about 2 to 8 hours.

13. The method of claim 11 wherein said pulse period consists of a plurality of small repeated discharges.

References Cited

UNITED STATES PATENTS

| | | | |
|---|---|---|---|
| 3,216,861 | 11/1965 | Cohn et al. | 136—86 |
| 3,300,345 | 1/1967 | Lyons | 136—86 |

ALLEN B. CURTIS, Primary Examiner